United States Patent
Sasaki et al.

(10) Patent No.: US 10,106,633 B2
(45) Date of Patent: Oct. 23, 2018

(54) METHOD AND APPARATUS FOR PRODUCING POLYMER AND METHOD AND APPARATUS FOR PRODUCING ORGANIC FILM

(71) Applicant: FLOSFIA INC., Kyoto-shi, Kyoto (JP)

(72) Inventors: Takahiro Sasaki, Kyoto (JP); Masaya Oda, Kyoto (JP); Toshimi Hitora, Kyoto (JP); Toyosuke Ibi, Kyoto (JP)

(73) Assignee: FLOSFIA, INC., Kyoto (JP)

( * ) Notice: Subject to any disclaimer, the term of this patent is extended or adjusted under 35 U.S.C. 154(b) by 0 days.

(21) Appl. No.: 14/975,210

(22) Filed: Dec. 18, 2015

(65) Prior Publication Data
US 2016/0215391 A1 Jul. 28, 2016

(30) Foreign Application Priority Data

Jan. 23, 2015 (JP) ................................. 2015-011858
Jan. 23, 2015 (JP) ................................. 2015-011859

(51) Int. Cl.
*C08F 112/08* (2006.01)
*C08F 2/01* (2006.01)
(Continued)

(52) U.S. Cl.
CPC ........ *C08F 112/08* (2013.01); *B05B 17/0615* (2013.01); *B05D 1/60* (2013.01); *C08F 2/01* (2013.01); *C08F 2/20* (2013.01)

(58) Field of Classification Search
CPC .. C08F 112/08; C08F 2/01; C08F 2/20; C08F 220/14; C08F 212/08; B05B 17/06; B05D 1/60; C08J 5/18
(Continued)

(56) References Cited

U.S. PATENT DOCUMENTS 5,972,428 A 10/1999 Hayashi et al.
6,503,564 B1 1/2003 Fleming et al.
(Continued)

FOREIGN PATENT DOCUMENTS

CN 1344185 A 4/2002
CN 101351868 A 1/2009
(Continued)

OTHER PUBLICATIONS

Crick, C.R., et al., "An Investigation Into Bacterial Attachment to an Elastomeric Superhydrophobic Surface Prepared via Aerosol Assisted Deposition," Thin Solid Films 519(11):3722-3727, Jan. 2011.
(Continued)

*Primary Examiner* — William K Cheung
(74) *Attorney, Agent, or Firm* — Christensen O'Connor Johnson Kindness PLLC (57) ABSTRACT

Provided is a method and an apparatus for producing a novel polymer that is easy and convenient to control the reactivity and excellent in film thickness control and a method and an apparatus for producing an organic film. A production apparatus includes: a first means for turning a raw-material solution containing an organic compound into a mist or droplets by an atomization or a droplet-formation; a second means for carrying the mist or droplets onto a substrate using a carrier gas; and a third means for subjecting the mist or droplets to a thermal reaction by heating on the substrate. Using the production apparatus, an organic film, such as a polymer film, is formed by atomizing or forming droplets from, for example, a raw-material solution containing the organic compound, such as a monomer, delivering a mist or droplets generated by the atomization or the droplet-formation to a substrate with a carrier gas, and, after the delivery, subjecting the mist or the droplets to a thermal reaction by heating on the substrate.

18 Claims, 9 Drawing Sheets

(51) Int. Cl.
*C08F 2/20* (2006.01)
*B05D 1/00* (2006.01)
*B05B 17/06* (2006.01)

(58) Field of Classification Search
USPC .................................................. 526/226, 348
See application file for complete search history.

(56) References Cited

U.S. PATENT DOCUMENTS

| | | | |
|---|---|---|---|
| 6,706,320 B2* | 3/2004 | Filippou | B05D 3/08 427/223 |
| 2001/0001284 A1* | 5/2001 | Shaw | B05D 1/60 428/216 |
| 2003/0068436 A1 | 4/2003 | Fleming et al. | |
| 2005/0089673 A1 | 4/2005 | Fleming et al. | |
| 2006/0153988 A1* | 7/2006 | Nomura | B32B 5/26 427/372.2 |
| 2006/0228966 A1* | 10/2006 | Gleason | A61L 15/24 442/123 |
| 2007/0032620 A1 | 2/2007 | Gleason et al. | |
| 2008/0187678 A1 | 8/2008 | Fleming et al. | |
| 2008/0292810 A1 | 11/2008 | Anderson et al. | |

FOREIGN PATENT DOCUMENTS

| | | |
|---|---|---|
| CN | 102212194 A | 10/2011 |
| JP | 61-078463 A | 4/1986 |
| KR | 10-2001-0052861 A | 6/2001 |
| TW | 406290 B | 9/2000 |
| WO | 99/65617 A1 | 12/1999 |
| WO | 2007/019495 A2 | 2/2007 |

OTHER PUBLICATIONS

Extended European Search Report dated May 30, 2016, issued in corresponding Patent Application No. EP 15 200 958.5, 7 pages.
Marchand, P., et al., "Aerosol-Assisted Delivery of Precursors for Chemical Vapour Deposition: Expanding the Scope of CVD for Materials Fabrication," Dalton Transactions 42(26):9406-9422, Jul. 2013.
Taiwanese Office Action dated May 18, 2016, issued in corresponding Taiwan Patent Application No. 104 142 634, 13 pages.
Taiwanese Office Action dated Nov. 22, 2016, issued in corresponding Application No. 104142634, filed Nov. 12, 2014, 12 pages.
Taiwanese Office Action dated Apr. 13, 2017, issued in corresponding Application No. 104142634, filed Nov. 12, 2014, 13 pages.
First Chinese Office Action and Translation dated Jul. 3, 2017, for Chinese Application No. 201510964311.4, filed Dec. 18, 2015, 8 pages.
European Office Action dated Aug. 23, 2017, issued in European Application No. 15 200 958.5, filed Dec. 17, 2015, 5 pages.
Berger, M., "Monomere," Römpp, https://roempp.thieme.de/roempp4.0/do/data/RD-13-03079> [retrieved on Aug. 7, 2017], Apr. 1, 2009.
Third Korean Office Action dated Mar. 29, 2018, issued in corresponding Korean Application No. 10-2015-0180871, filed Dec. 17, 2015, 15 pages.

* cited by examiner

METHOD AND APPARATUS FOR PRODUCING POLYMER AND METHOD AND APPARATUS FOR PRODUCING ORGANIC FILM

TECHNICAL FIELD

The present invention relates to a novel method and a novel apparatus for producing a polymer and a novel method and a novel apparatus for producing an organic film.

BACKGROUND

As a type of polymer thin film forming method, vacuum deposition polymerization has been known (e.g., Japanese Unexamined Patent Application Publication No. S61-78463). In vacuum deposition polymerization, a polymer thin film is formed by vacuum-evaporating two or more kinds of monomers and polymerizing the monomers, for example, on a substrate in vacuum. It is possible to control, in nano order, the film thickness of a polymer thin film formed by such vacuum deposition polymerization.

However, raw materials that may be used for vacuum deposition are limited, and when a plurality of raw materials are used, it has problems, such as difficulty in the control of reactivity. There are also problems, such as the requirement of vacuum equipment and the complicated control of a polymerization reaction, and thus such vacuum deposition has not been necessarily satisfactory in all cases.

In addition, the polymerization apparatus used for the vacuum deposition polymerization also has problems, such as the requirement of vacuum equipment and the complicated control of a polymerization reaction. Therefore, there has been a demand for a polymerization apparatus that is easy to control and capable of film thickness control in nano order to replace the vacuum deposition polymerization apparatus.

SUMMARY

An object of the present invention is to provide a novel method for producing a polymer that is easy and convenient to control the reactivity and excellent in film thickness control and a novel apparatus for producing the polymer and a novel method and a novel apparatus for producing an organic film.

In order to achieve the above-mentioned object, the present inventors have made intensive investigation. As the result, the present inventors found that a polymerization reaction by mist CVD, surprisingly, leads to easy fabrication of a polymer thin film, easy control of a film thickness, and easy control of reactivity. They were further successful to produce a polymer production apparatus including: a first means for turning a raw material solution containing a monomer into a mist or droplets by an atomization or a droplet-formation; a second means for carrying the mist or droplets onto a substrate using a carrier gas; and a third means for subjecting the mist or droplets to a thermal reaction by heating on the substrate for polymerization. Then, they also found that a polymerization reaction by mist CVD using the apparatus surprisingly leads to easy fabrication of a polymer thin film, easy control of a film thickness, and easy control of reactivity. They thus found out that such a method and an apparatus for producing a polymer are capable of solving the above conventional problems all together.

After obtaining the above findings, the present inventors conducted further examination and then completed the present invention.

The present invention is as follows.

[1] A method for producing a polymer by a polymerization from a monomer, includes: a first step of turning a raw material solution containing the monomer into a mist or droplets by an atomization or a droplet-formation; a second step of carrying the mist or droplets onto a substrate using a carrier gas; and a third step of subjecting the mist or droplets to a thermal reaction by heating on the substrate.

[2] The method of the above [1], wherein the monomer is a vinyl monomer and the raw-material solution contains a radical polymerization initiator.

[3] The method of the above [1] or [2], wherein the raw-material solution contains water.

[4] The method of the above [1] or [2], wherein the raw-material solution contains an organic solvent.

[5] The method of the above [1] or [2], wherein the raw-material solution contains no solvent.

[6] The method of any of the above [1] through [5], wherein the heating is carried out from 80° C. to 600° C.

[7] A polymer produced by the method of any of the above [1] through [6].

[8] An apparatus for producing a polymer, includes: a first means for turning a raw material solution containing a monomer into a mist or droplets by an atomization or a droplet-formation; a second means for carrying the mist or droplets onto a substrate using a carrier gas; and a third means for subjecting the mist or droplets to a thermal reaction by heating on the substrate.

[9] The apparatus of the above [8], wherein the first means is configured to perform the atomization or the droplet-formation by ultrasonic vibration.

[10] The apparatus of the above [8], wherein the carrier gas is an inert gas.

[11] The apparatus of any of the above [8] through [10], wherein the heating is carried out from 80° C. to 600° C.

[12] The apparatus of any of the above [8] through [11], wherein the monomer is a vinyl monomer the raw-material solution contains a radical polymerization initiator.

[13] The apparatus of the above [12], further includes an entrapment means configured to trap the radical polymerization initiator.

[14] A method for producing an organic film by reaction of an organic compound, includes: a first step of turning a raw-material solution containing the organic compound into a mist or droplets by an atomization or a droplet-formation; a second step of carrying the mist or droplets onto a substrate using a carrier gas; and a third step of subjecting the mist or droplets to a thermal reaction by heating on the substrate.

[15] The method of the above [14], wherein the raw-material solution contains water.

[16] The method of the above [14], wherein the raw-material solution contains an organic solvent.

[17] The method of the above [14], wherein the raw-material solution contains no solvent.

[18] The method of any of the above [14] through [17], wherein the heating is carried out from 80° C. to 600° C.

[19] An apparatus for producing an organic film, includes: a first means for turning a raw-material solution containing an organic compound into a mist or droplets by an atomization or a droplet-formation; a second means for carrying the mist or droplets onto a substrate using a carrier gas; and a third means for subjecting the mist or droplets to a thermal reaction by heating on the substrate.

The method and the apparatus for producing a polymer and the method and the apparatus for producing an organic film of the present invention are easy and convenient to control the reactivity and excellent in film thickness control.

DETAILED DESCRIPTION

A method for producing a polymer of the present invention includes: a first step of turning a raw material solution containing the monomer into a mist or droplets by an atomization or a droplet-formation; a second step of carrying the mist or droplets onto a substrate using a carrier gas; and a third step of subjecting the mist or droplets to a thermal reaction by heating on the substrate.

The polymerization may be a known polymerization reaction. Examples of such polymerization reaction include sequential polymerization (e.g., polycondensation or polyaddition) and chain polymerization (e.g., addition polymerization or ring-opening polymerization). In the present invention, it is preferred that the polymerization is radical polymerization.

The raw-material solution is not particularly limited as long as it contains the monomer and it is capable of being atomized or formed into droplets. The solvent is also not particularly limited as long as the objects of the present invention are not impaired, and the solution may be solvent free. Examples of the solvent include known inorganic solvents and organic solvents. Specifically, it is possible to use, by appropriately selecting, one or more types of water; and organic solvents like monohydric alcohols, such as methanol, ethanol, propanol, isopropyl alcohol, butanol, pentanol, hexanol, cyclohexanol, methylcyclohexanol, and benzyl alcohol; polyhydric alcohols and derivatives thereof, such as ethylene glycol, propylene glycol, ethylene glycol diacetate, ethylene glycol dimethyl ether, ethylene glycol diethyl ether, ethylene glycol dibutylether, ethylene glycol monomethyl ether, ethylene glycol monoethyl ether, ethylene glycol monomethyl ether acetate, ethylene glycol monoethyl ether acetate, diethylene glycol, diethylene glycol diacetate, propylene glycol monomethyl ether, propylene glycol monoethyl ether, propylene glycol monobutylether, propylene glycol monomethyl ether acetate, and glycerol; amides, such as dimethylformaldehyde; ethers, such as diethyl ether and dioxane; ketone-based solvents, such as acetone, methyl ethyl ketone, diisobutyl ketone, diisopropyl ketone, diethyl ketone, cyclohexanone, and methyl isobutyl ketone; halogen compounds, such as chloroform, dichloromethane, and carbon tetrachloride; ester-based solvents, such as methyl acetoacetate, ethyl acetoacetate, methyl benzoate, ethyl benzoate, ethyl acetate, and butyl acetate; and hydrocarbon-based solvents, such as benzene, toluene, xylene, and cyclohexane.

In the present invention, the raw-material solution preferably contains water and more preferably contains a water dispersion where a monomer solution is dispersed in water. More specific examples of the water include pure water, ultrapure water, tap water, well water, mineral spring water, mineral water, hot spring water, spring water, fresh water, and seawater. Examples of the water also include water obtained by subjecting such water to treatment, such as purification, heating, sterilization, filtration, ionic exchange, electrolysis, osmotic pressure adjustment, buffering (e.g., ozone water, purified water, hot water, deionized water, physiological saline, phosphate-buffered solution, phosphate-buffered saline).

In the present invention, it is also preferred that the raw-material solution contains an organic solvent and that the raw-material solution contains no solvent. In the present invention, film formation using water or the organic solvent for the raw-material solution enables not only easy control of reactivity and the film thickness but also easy fabrication of a polymer thin film excellent in adhesion. In the present invention, solvent free film formation enables not only easy fabrication of a polymer thin film excellent in adhesion but also fabrication of a high molecular weight polymer film in a short time.

The monomer is not particularly limited as long as it is a polymerizable monomer, and it may be a known monomer. For example, when the raw-material solution is a water dispersion, the monomer is preferably a hydrophobic monomer.

Examples of the monomer include a polymerizable compound having, in a molecule, at least one functional group containing at least one selected from nitrogen, oxygen, sulfur, halogen, and metal or at least one vinyl group that may be substituted. Examples of the functional group include an isocyanate group, a thioisocyanate group, an amino group, an imino group, a sulfone group, a hydroxy group, a carboxy group, a thiocarboxy group, a carbonyl group, a thiocarbonyl group, a formyl group, a thioformyl group, a silanol group, a hydrocarbyloxy group, a nytril group, a pyridyl group, an amide group, an imide group, an imidazolyl group, an ammonium group, a hydrazo group, an azo group, a diazo group, a ketimine group, an epoxy group, a thioepoxy group, an oxycarbonyl group (ester bond), a carbonylthio group (thioester bond), an oxy group (ether bond), a glycidoxy group, a sulfide group (thioether bond), a disulfide group, a mercapto group, a hydrocarbylthio group, a sulfonyl group, a sulfinyl group, an imine residue, other nitrogen-containing, oxygen-containing, and sulfur-containing heterocyclic groups, a hydrocarbyloxysilyl group, an organotin group, chlorine, and bromine. The monomer may contain one or more types of these functional groups.

In the present invention, it is preferred that the monomer is a vinyl monomer containing a vinyl group that may be substituted. The vinyl monomer is not particularly limited as long as the monomer contains one or more vinyl groups that may be substituted. The vinyl group may have a substituent to the extent possible to polymerize and to the extent chemically allowed. Examples of the substituent include halogen, a C1-6 alkoxy group, a C2-6 alkenyloxy group, a C2-6 alkynyloxy group, a C1-6 alkylthio group, a C2-6 alkenylthio group, a C2-6 alkynylthio group, a C1-6 haloalkoxy group, a C2-6 haloalkenyloxy group, a C1-6 haloalkylthio group, a C2-6 haloalkenylthio group, a nitro group, a hydroxyl group, a mercapto group, a cyano group, an epoxy group, and a glycidyl group. The number of substituents is not particularly limited as long as the number allows substitution, which is preferably from 1 to 6 and more preferably from 1 to 3.

Examples of the vinyl monomer include aromatic vinyl monomers, such as styrene, α-methylstyrene, and chlorostyrene; acrylic esters, such as methyl acrylate, ethyl acrylate, and butyl acrylate; methacrylic esters, such as methyl methacrylate and ethyl methacrylate; vinyl monomers having a carboxyl group, such as acrylic acid and methacrylic acid; vinyl halides and vinylidene halides, such as vinyl chloride, vinyl bromide, and vinylidene chloride; vinyl esters, such as vinyl acetate and vinyl propionate; nitriles, such as acrylonitrile and methacrylonitrile; and conjugated dienes, such as butadiene and isoprene. These monomers may be polymerized singly or copolymerized by using two or more. In the present invention, the vinyl monomer is preferably one or more types selected from aromatic vinyl monomers, acrylic esters, methacrylic esters, and vinyl monomers having a carboxyl group.

As an initiator for the radical polymerization, those having been used for vinyl chloride system polymerization may be used. Specifically, it is possible to use singly one type, or two or more types in combination, of oil soluble polymerization initiators like perester compounds, such as t-butyl peroxyneodecanoate, t-butyl peroxypivalate, t-hexyl peroxyneodecanoate, t-hexyl neohexanoate, t-hexyl peroxypivalate, α-cumyl peroxyneodecanoate, and 2,4,4-trimethylpentyl-2-peroxy-2-neodecanoate; percarbonate compounds, such as diisopropyl peroxydicarbonate, di-2-ethoxyethyl peroxydicarbonate, di-2-ethylhexyl peroxydicarbonate, dimethoxyisopropyl peroxydicarbonate, and diethoxyethyl peroxydicarbonate; peroxides, such as decanoyl peroxide, benzoyl peroxide, cumene hydroperoxide, cyclohexanone peroxide, 2,4-dichlorobenzoyl peroxide, p-methane hydroperoxide, isobutyryl peroxide, acetyl cyclohexyl sulfonyl peroxide, 2,4,4-trimethylpentyl-2-peroxyphenoxyacetate, 3,5,5-trimethylhexanoyl peroxide, lauroyl peroxide, di-t-butyl peroxide, and t-butyl peroxybenzoate; and azo compounds, such as α,α'-azobisisobutyronitrile, α,α'-azobis(2,4-dimethylvaleronitrile), and α,α'-azobis(4-methoxy-2,4-dimethylvaleronitrile). It is further possible to use such oil soluble polymerization initiator together with a water soluble polymerization initiator, such as potassium persulfate, ammonium persulfate, and hydrogen peroxide.

In the present invention, a dispersant, a chain-transfer agent, and the like may be used. Examples of the dispersant include known dispersants and specifically include water soluble cellulose ethers, such as polyvinyl alcohol (PVA), modified PVA resins, methylcellulose, hydroxyethyl cellulose, and hydroxypropyl cellulose; water soluble polymers, such as polyvinylpyrrolidone and gelatin; oil soluble emulsions, such as sorbitan monolaurate, sorbitan trioleate, glycerol tristearate, and ethylene oxide-propylene oxide block polymers; and water soluble emulsifiers, such as polyoxyethylene glycerol oleate and sodium laurate. One type of these other dispersants may be used or more types of them may be used simultaneously.

As the chain-transfer agent, specifically, mercaptans, such as 2-mercapto-2-thiazoline and 2-mercapto ethanol; and organophosphorous compounds, such as 9,10-dihydro-9-oxa-10-phosphaphenanthrene-10-oxide, are used. Other polymerization conditions may be normal conditions. For example, the amount of charged aqueous medium used for dispersion of the polymer component in the monomer is represented by a charge ratio to the monomer (water/monomer), at a weight ratio, usually from 1 to 1000 approximately, preferably from 5 to 500 approximately, and more preferably from 10 to 100 approximately. Water may be added during the polymerization as desired, and a polymerization modifier, a pH adjusting agent, a gelation modifier, an antistatic agent, a crosslinker, a stabilizer, a filler, an antioxidant, a buffer agent, a scale inhibitor, and the like may optionally be added.

The substrate is not particularly limited as long as the objects of the present invention are not impaired. Examples of the shape of the substrate include a plate shape, such as a flat plate and a disk, a fibrous shape, a rod shape, a cylindrical shape, a prismatic shape, a tubular shape, a spiral shape, a spherical shape, and a ring shape. Examples of the type of the substrate include, but not limited to, an inorganic material in a film, multilayer, plate, or sheet shape, such as a semiconductor material, a glass plate, a glass cloth, a glass sheet, and a metal plate; paper, such as high quality paper, medium quality paper, and coated paper; synthetic paper; fabric; timber; film and sheet of a plastic, such as polyester, polyamide, polystyrene, polyvinyl chloride, polymethyl methacrylate, cellulose acetate, polycarbonate, and polyimide; film laminated paper and woven fabric sheet; and a semiconductor device.

In the present invention, a mist or droplets are generated by atomizing or forming droplets from a raw-material solution containing the monomer (atomizing and droplet-forming step), delivered to a substrate with a carrier gas (mist delivery step), and, after the delivery, the mist or the droplets are subjected to a thermal reaction by heating on the substrate (thermal reaction step).

In the atomizing and droplet-forming step, a raw-material solution is prepared and a mist or droplets is generated by atomizing or forming droplets from the raw-material solution. An atomizing or droplet-formation means is not particularly limited as long as it is capable of atomizing or forming droplets from the raw-material solution, and it may be a known atomizing or droplet-formation means. In the present invention, an atomizing or droplet-formation means using ultrasonic waves is preferred.

In the mist delivery step, the mist or the droplets are delivered to the substrate using a carrier gas. The type of carrier gas is not particularly limited as long as the objects of the present invention are not impaired. Preferred examples of the carrier gas include an inert gas, such as oxygen, ozone, nitrogen, and argon, and a reducing gas, such as a hydrogen gas and a forming gas. The type of carrier gas may be one or more, and a diluted gas with a varied carrier gas concentration (e.g., 10-fold diluted gas) and the like may be used further as a second carrier gas. The carrier gas may be supplied from one or more locations. While the flow rate of the carrier gas is not particularly limited, it is preferably from 0.01 to 20 L/min. and more preferably from 1 to 10 L/min. when, for example, a film is formed on a 30 mm square substrate.

In the thermal reaction step, the mist or the droplets are subjected to a thermal reaction for film formation on all or part of a surface of the substrate. While the reaction is not particularly limited as long as the reaction forms a film from the mist or the droplets, thermal reaction by heating is preferred in the present invention. The thermal reaction may be in any form as long as the mist or the droplets react on heating, and reaction conditions are also not particularly limited as long as the objects of the present invention are not impaired. While conditions for the thermal reaction are not particularly limited in the present step, the heating temperature is usually from 80° C. to 600° C. When the raw-material solution contains water, the heating temperature preferably ranges from 120° C. to 600° C., more preferably from 120° C. to 350° C., and most preferably from 130° C. to 300° C. When the raw-material solution contains the organic solvent or contains no solvent, the heating temperature is preferably from 80° C. to 150° C. and more preferably from 80° C. to 120° C. The thermal reaction may be carried out, as long as the objects of the present invention are not impaired, in any of vacuum, a non-oxygen atmosphere, a reducing gas atmosphere, and an oxygen atmosphere. While it may also be carried out in any condition of under atmospheric pressure, increased pressure, and reduced pressure, it is preferably carried out under atmospheric pressure in the present invention. While the thermal reaction is usually accompanied by a polymerization reaction, it is not particularly limited in the present invention and the polymerization reaction may be produced on the substrate and the polymerization reaction may be produced in the mist or the droplets.

The polymerization carried out as above enables production of a polymer that is excellent in adhesion to the substrate, and adjustment of the reaction time enables control of the polymer film thickness in nano order. The present invention is also useful for thinning of a polymer film composite material that used to be difficult to be thinned, and when used for a semiconductor device as a substrate, for example, it may also be utilized for a device package.

The apparatus for producing a polymer of the present invention includes: a first means for turning a raw material solution containing a monomer into a mist or droplets by an atomization or a droplet-formation; a second means for carrying the mist or droplets onto a substrate using a carrier gas; and a third means for subjecting the mist or droplets to a thermal reaction by heating on the substrate.

While the production apparatus of the present invention is described below with reference to the drawings, the present invention is not limited to the drawings.

Figure 1:
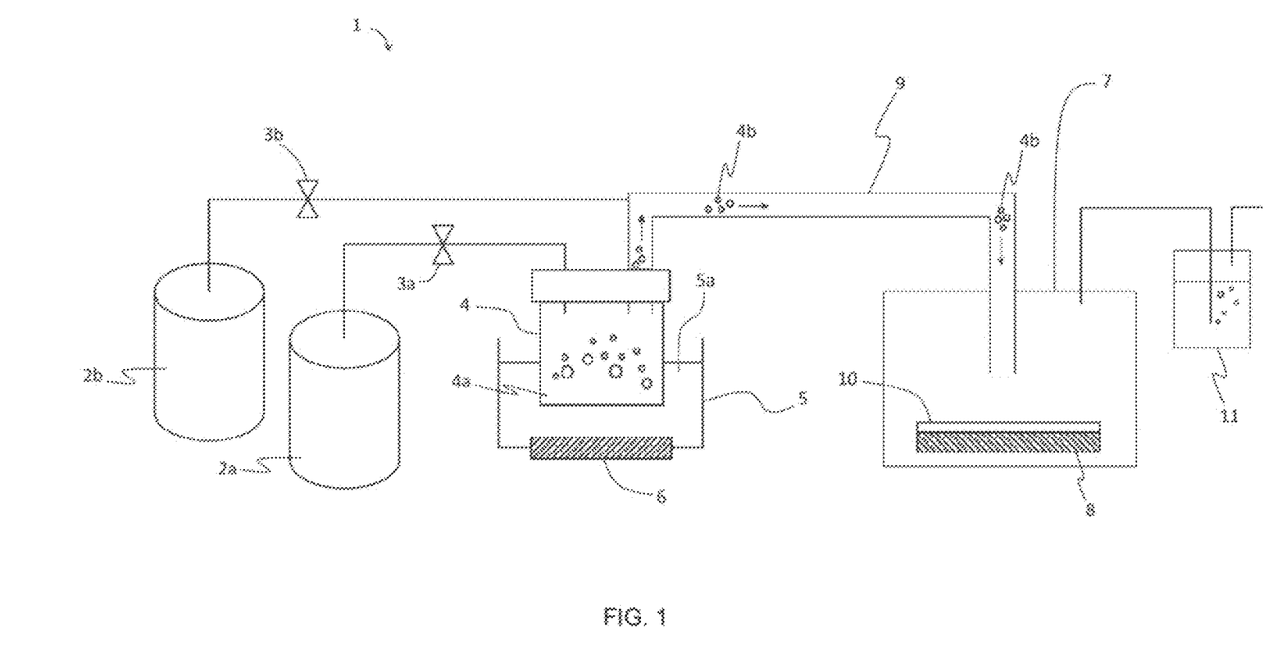
FIG. 1 is a schematic configuration diagram showing an example of a production apparatus of the present invention.

FIG. 1 illustrates an example of the production apparatus of the present invention. A production apparatus 1 is provided with a carrier gas source 2a to supply a carrier gas, a flow regulating valve 3a to regulate a flow rate of the carrier gas discharged from the carrier gas source 2a, a dilution carrier gas source 2b to supply a dilution carrier gas, a flow regulating valve 3b to regulate the flow rate of the dilution carrier gas discharged from the dilution carrier gas source 2b, a mist generator 4 to store a raw-material solution 4a, a container 5 to keep water 5a, an ultrasonic vibration transducer 6 mounted at a bottom of the container 5, a film formation chamber 7, a supply pipe 9 connecting the mist generator 4 to the film formation chamber 7, a hot plate 8 placed in the film formation chamber 7, and a trap tank 11. On the hot plate 8, a substrate 10 is placed.

Figure 2:
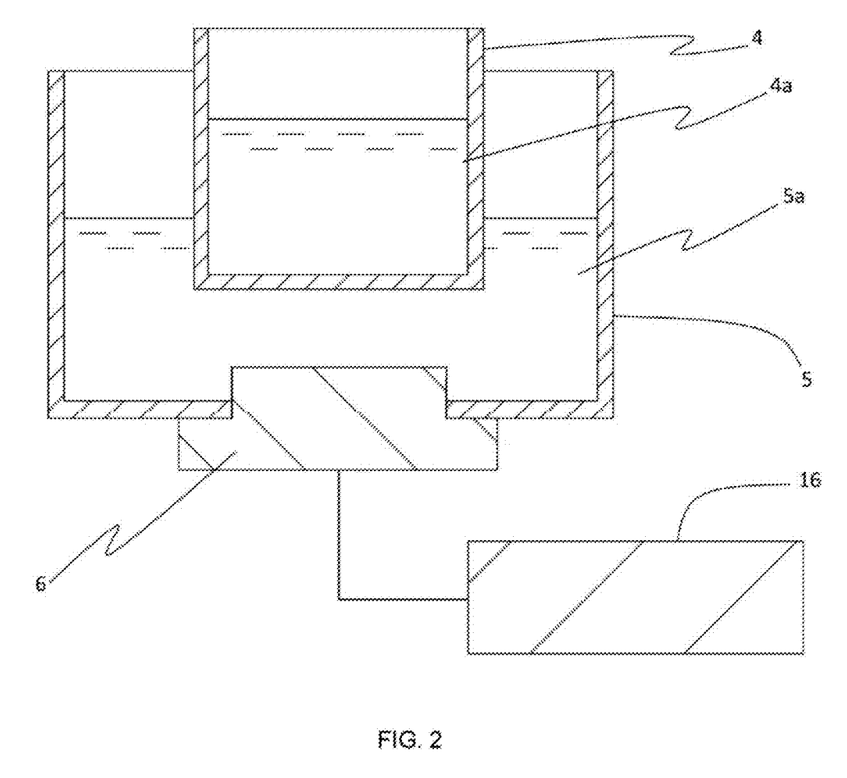
FIG. 2 is a drawing illustrating an embodiment of a first means used in the present invention.

The production apparatus 1 of the present invention includes a first means for turning the raw material solution containing the monomer into the mist or droplets by the atomization or the droplet-formation. FIG. 2 illustrates an embodiment of the first means. The mist generator 4 made with a container storing the raw-material solution 4a is placed in the container 5 storing the water 5a using a support, not shown. At the bottom of the container 5, the ultrasonic vibration transducer 6 is provided, and the ultrasonic vibration transducer 6 is connected to an oscillator 16. When the oscillator 16 is activated, the ultrasonic vibration transducer 6 vibrates and the ultrasonic waves propagate in the mist generator 4 via the water 5a to atomize or form droplets from the raw-material solution 4a.

Figure 3:
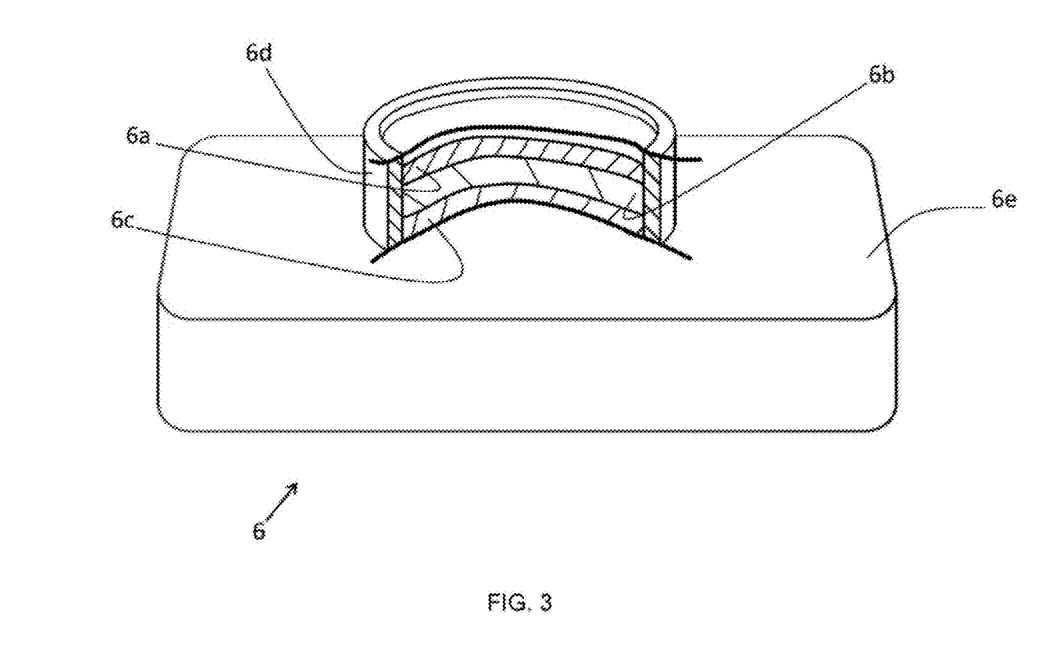
FIG. 3 is a drawing showing an embodiment of an ultrasonic vibration transducer in FIG. 2.

FIG. 3 illustrates an embodiment of the ultrasonic vibration transducer 6 shown in FIG. 2. In the ultrasonic vibration transducer 6 in FIG. 2, a piezoelectric element 6b in a disk shape is provided in a tubular elastic body 6d on a support 6e, and the piezoelectric element 6b has electrodes 6a and 6c on both sides. The transducer 6 is configured to, when the oscillator 16 is connected to the electrodes 6a and 6c to change the oscillation frequency, generate ultrasonic waves with a resonant frequency in a thickness direction and a resonant frequency in a radical direction of the piezoelectric element 6b.

As described above, in the first means, a raw-material solution is prepared and a mist or droplets are generated by atomizing or forming droplets from the raw-material solution. An atomizing or droplet-formation means is not particularly limited as long as it is capable of atomizing or forming droplets from the raw-material solution and may be a known atomizing or droplet-formation means. In the present invention, an atomizing or droplet-formation means by ultrasonic waves is preferred.

In the second means, the mist or the droplets are delivered to the substrate using a carrier gas. The type of carrier gas is not particularly limited as long as the objects of the present invention are not impaired. Preferred examples of the carrier gas include an inert gas, such as oxygen, ozone, nitrogen, and argon, and a reducing gas, such as a hydrogen gas and a forming gas. The type of carrier gas may be one or more, and a diluted gas with a varied carrier gas concentration (e.g., 10-fold diluted gas) and the like may be used further as a second carrier gas. The carrier gas may be supplied in one or more areas. While the flow rate of the carrier gas is not particularly limited, it is preferably from 0.01 to 20 L/min. and more preferably from 1 to 10 L/min. when, for example, a film is formed on a 30 mm square substrate. In the present invention, the carrier gas is preferably an inert gas and more preferably a nitrogen gas.

In the third means, the mist or the droplets are subjected to a thermal reaction for film formation on all or part of a surface of the substrate. While the reaction is not particularly limited as long as the reaction forms a film from the mist or the droplets, thermal reaction by heating is preferred in the present invention. The thermal reaction may be in any form as long as the mist or the droplets react on heating, and reaction conditions are also not particularly limited as long as the objects of the present invention are not impaired. While conditions for the thermal reaction are not particularly limited in the present step, the heating temperature is usually from 80° C. to 600° C. When the raw-material solution contains water, the heating temperature preferably ranges from 120° C. to 600° C., more preferably from 120° C. to 350° C., and most preferably from 130° C. to 300° C. When the raw-material solution contains the organic solvent or contains no solvent, the heating temperature is preferably from 80° C. to 150° C. and more preferably from 80° C. to 120° C. The thermal reaction may be carried out, as long as the objects of the present invention are not impaired, in any of vacuum, a non-oxygen atmosphere, a reducing gas atmosphere, and an oxygen atmosphere. While it may also be carried out in any condition of under atmospheric pressure, increased pressure, and reduced pressure, it is preferably carried out under atmospheric pressure in the present invention. While the thermal reaction is usually accompanied by a polymerization reaction, it is not particularly limited in the present invention and the polymerization reaction may be produced on the substrate and the polymerization reaction may be produced in the mist or the droplets. The polymerization is carried out preferably in a non-oxygen atmosphere, more preferably in an inert gas atmosphere, and most preferably in a nitrogen atmosphere.

Figure 4:
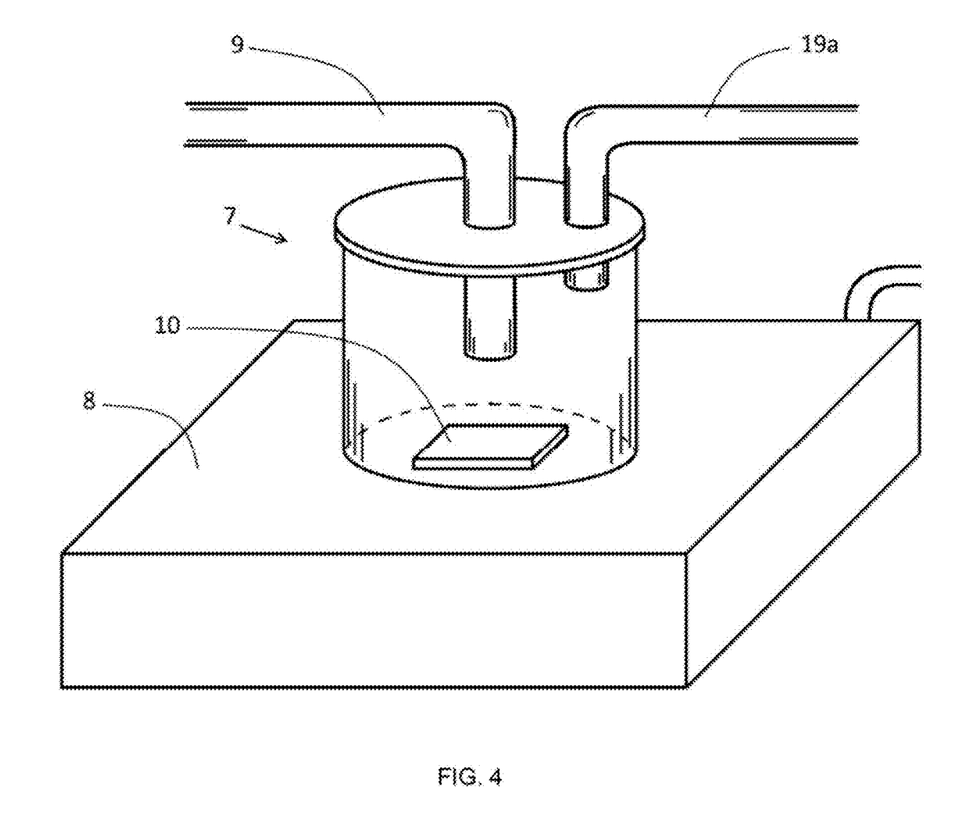
FIG. 4 is a drawing showing an embodiment of a third means used in the present invention.

FIG. 4 illustrates an embodiment of the third means. The film formation chamber 7 in FIG. 4 is in a tubular shape and provided on the hot plate 8. The film formation chamber 7 is connected to the mist generator 4 via the supply pipe 9 and configured to let a mist or droplets 4b generated in the mist generator 4 flow into the film formation chamber 7 through the supply pipe 9 with the carrier gas for a thermal reaction on the substrate 10 placed on the hot plate 8. The film formation chamber 7 is also connected to an exhaust pipe 19a and configured to deliver the mist, the droplets, or the gas after the thermal reaction to the exhaust pipe 19a. In the present invention, it is preferred that an entrapment means is further provided to apply entrapment process to the mist, the droplets, or the gas after the thermal reaction.

Figure 5:
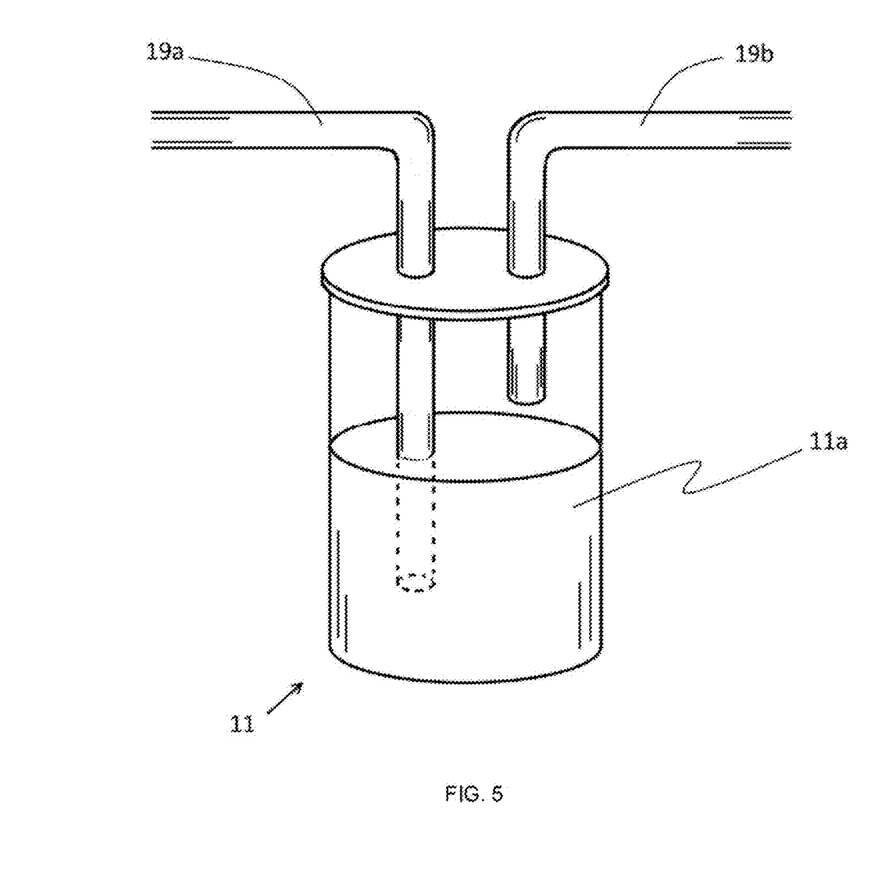
FIG. 5 is a drawing showing an embodiment of an entrapment means used preferably in the present invention.

FIG. 5 illustrates an embodiment of the entrapment means. The trap tank 11 in FIG. 5 is connected to, for example, the exhaust pipe 19a in FIG. 4 and configured to let the mist, the droplets, or the gas after the thermal reaction flow into the trap tank 11. The trap tank 11 contains a trap liquid (e.g., a solvent in which a target substance is dissolved) 11a and is configured to make the mist, the droplets, or the gas after the thermal reaction having flown into the trap tank 11 contact with the trap liquid 11a to trap the target substance and let the rest flow to an exhaust pipe 19b. Such configuration enables safer and more convenient polymerization in a mist.

With reference to FIG. 1, a mode of using the production apparatus of the present invention is described below.

Firstly, the raw-material solution 4a containing the monomer is stored in the mist generator 4, the substrate 10 is placed on the hot plate 8, and the hot plate 8 is activated. Then, the flow regulating valve 3 (3a and 3b) is opened to supply the carrier gas from the carrier gas source 2 (2a and 2b) into the film formation chamber 7. After the atmosphere in the film formation chamber 7 is sufficiently purged with the carrier gas, the flow rate of the carrier gas and the flow rate of the dilution carrier gas are regulated respectively. Then, the ultrasonic vibration transducer 6 is vibrated, and the vibration propagates through the water 5a to the raw-material solution 4a. By thus atomizing or forming droplets from the raw-material solution 4a, the mist or droplets 4b are generated. Subsequently, the mist or droplets 4b are introduced to the film formation chamber 7 with the carrier gas and thermally reacted by heating of the hot plate 8 in the film formation chamber 7 to form a polymer on the substrate 10. After the polymer formation, the mist, the droplets, or the gas that is after the thermal reaction or is unreacted is delivered to the trap tank 11 containing a predetermined solvent to trap a chemical substance, such as a polymerization initiator, (e.g., a chemical substance that is flammable or explosive in the atmosphere) and subsequently subjected to exhaust treatment.

The use of the production apparatus of the present invention as above enables production of a polymer that is excellent in adhesion to the substrate, and adjustment of the reaction time enables control of the polymer film thickness in nano order. The present invention is also useful for thinning of a polymer film composite material that used to be difficult to be thinned, and when used for a semiconductor device as a substrate, for example, it may also be utilized for a device package.

The present invention is applicable not only to polymers but also to organic films other than polymers, and the present invention includes a method and an apparatus for producing an organic film that are applied to an organic film in such a manner. That is, the method for producing the organic film of the present invention by reaction of the organic compound, includes: a first step of turning a raw-material solution containing the organic compound into a mist or droplets by an atomization or a droplet-formation; a second step of carrying the mist or droplets onto a substrate using a carrier gas; and a third step of subjecting the mist or droplets to a thermal reaction by heating on the substrate. The apparatus for producing an organic film of the present invention, includes: a first means for turning a raw-material solution containing an organic compound into a mist or droplets by an atomization or a droplet-formation; a second means for carrying the mist or droplets onto a substrate using a carrier gas; and a third means for subjecting the mist or droplets to a thermal reaction by heating on the substrate.

The organic compound and the organic film are not particularly limited, respectively, as long as the objects of the present invention are not impaired, and they may be known ones. They may be a low molecular weight material and may be an oligomer. The means and the like used in the method for producing an organic film of the present invention may be same as those in the method for producing a polymer described above. In the present invention, when an adhesion improved raw-material solution contains water or an organic solvent, it is possible to improve the adhesion. Similarly, it is also preferred that the solution contains no solvent.

EXAMPLES

While Examples of the present invention are described below, the present invention is not limited to them.

Example 1

1. Production Apparatus

Firstly, with reference to FIG. 1, the production apparatus 1 used in the present Example is described. The production apparatus 1 was provided with the carrier gas source 2a to supply a carrier gas, the flow regulating valve 3a to regulate the flow rate of the carrier gas discharged from the carrier gas source 2a, a dilution carrier gas source 2b to supply a dilution carrier gas, the flow regulating valve 3b to regulate the flow rate of the dilution carrier gas discharged from the dilution carrier gas source 2b, the mist generator 4 to store the raw-material solution 4a, the container 5 to keep the water 5a, the ultrasonic vibration transducer 6 mounted at a bottom of the container 5, the film formation chamber 7, the supply pipe 9 connecting the mist generator 4 to the film formation chamber 7, the hot plate 8 placed in the film formation chamber 7, and an alcohol trap tank 11. On the hot plate 8, the substrate 10 is placed.

2. Preparation of Raw-Material Solution

Each component was mixed as shown in Table 1 below to prepare the raw-material solution.

TABLE 1

| | |
|---|---|
| Styrene | 300 parts by weight |
| Methyl Methacrylate | 700 parts by weight |
| Polyvinylpyrrolidone (Dispersant) | 50 parts by weight |
| Azobisisobutyronitrile (AIBN) | 10 parts by weight |
| Water | 15,000 parts by weight |

3. Preparation for Film Formation

The raw-material solution 4a obtained in above 2. was stored in the mist generator 4. Then, as the substrate 10, a 10 mm square glass plate was placed on the hot plate 8 and the hot plate 8 was activated to raise the temperature in the film formation chamber 7 to 150° C. Then, the flow regulating valve 3 (3a and 3b) was opened to supply the carrier gas from the carrier gas source 2 (2a and 2b) into the film formation chamber 7. After the atmosphere in the film formation chamber 7 was sufficiently purged with the carrier gas, the flow rate of the carrier gas was regulated at 5 L/min. and the flow rate of the dilution carrier gas at 0.5 L/min. As the carrier gas, nitrogen was used.

4. Single Layer Film Formation

Then, the ultrasonic vibration transducer 6 was vibrated at 2.4 MHz and the vibration propagated through the water 5a to the raw-material solution 4a. The raw-material solution 4a was thus microparticulated to generate raw-material microparticles 4b. The raw-material microparticles 4b were introduced to the film formation chamber 7 with the carrier gas and reacted in the film formation chamber 7 at 150° C. under atmospheric pressure to form a thin film on the substrate 10. The film formation time was one hour.

5. Evaluation

For the polymer film obtained in the above 4., the film thickness was measured to find it 50 nm. After the polymer film was immersed in hot water at 90° C. for 30 minutes, it was taken out to be observed on the surface and no separation was found at all. Further, when the film surface was scratched at 300 mm/min. while a load of 200 g was applied on a needle tip using a scratch tester, it was found that there was no separation and the adhesion was excellent.

Figure 6:
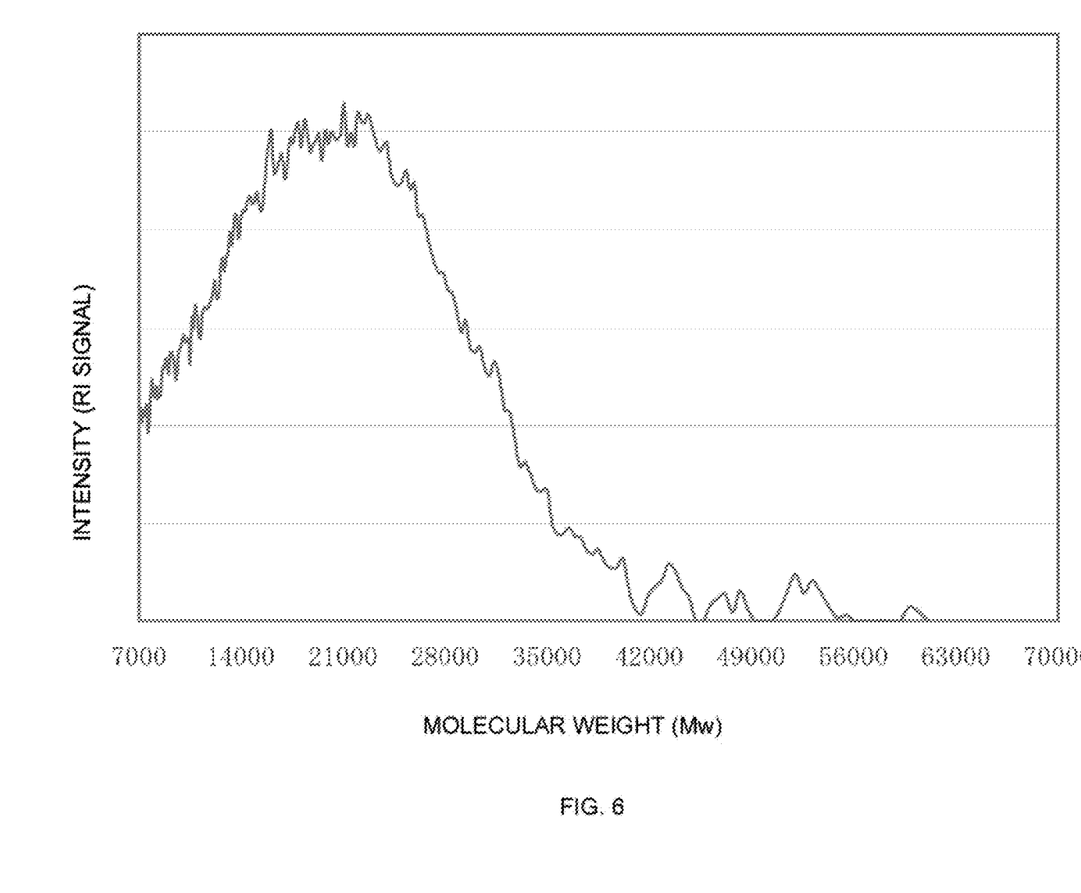
FIG. 6 is a drawing showing part of GPC measurement results in Example 1.

When the weight average molecular weight of the polymer film obtained in above 4. was measured by gel permeation chromatography (GPC), the weight average molecular weight was 17500. FIG. 6 illustrates part of the GPC measurement results.

Example 2

A polymer film was obtained in the same manner as Example 1 other than using a solution obtained by mixing each component shown in Table 2 as the raw-material solution, setting the flow rate of the carrier gas at 3 L/min., and setting the film formation temperature at 80° C.

TABLE 2

| Styrene | 100 parts by weight |
| --- | --- |
| Azobisisobutyronitrile (AIBN) | 1 parts by weight |
| Toluene | 100 parts by weight |

Figure 7:
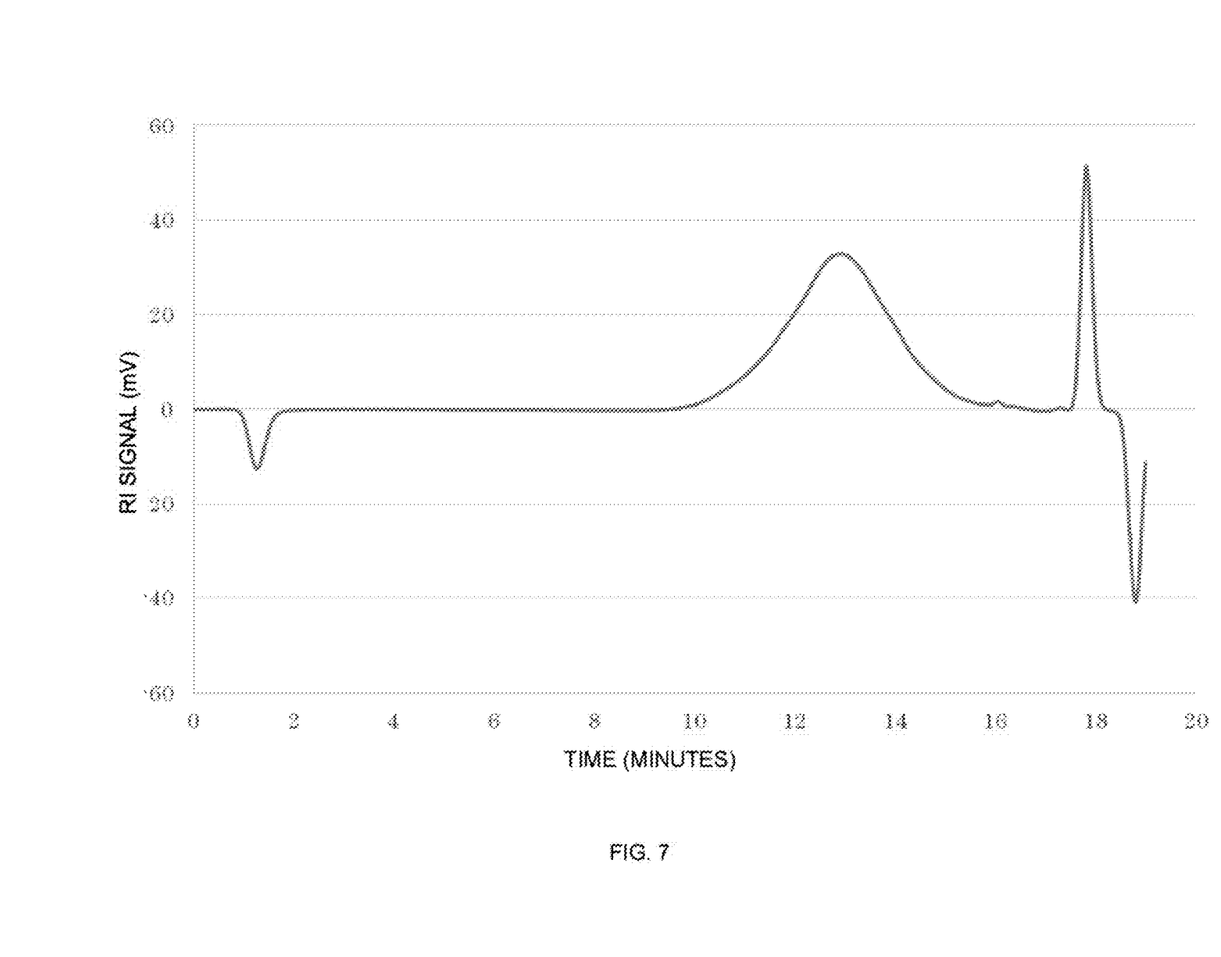
FIG. 7 is a drawing showing a GPC chart in Example 2.

Evaluation was made in the same manner as Example 1. A good film similar to the polymer film in Example 1 was obtained, and the polymer film obtained in Example 2 had a weight average molecular weight of 18411. FIG. 7 illustrates a GPC chart.

Example 3

Figure 8:
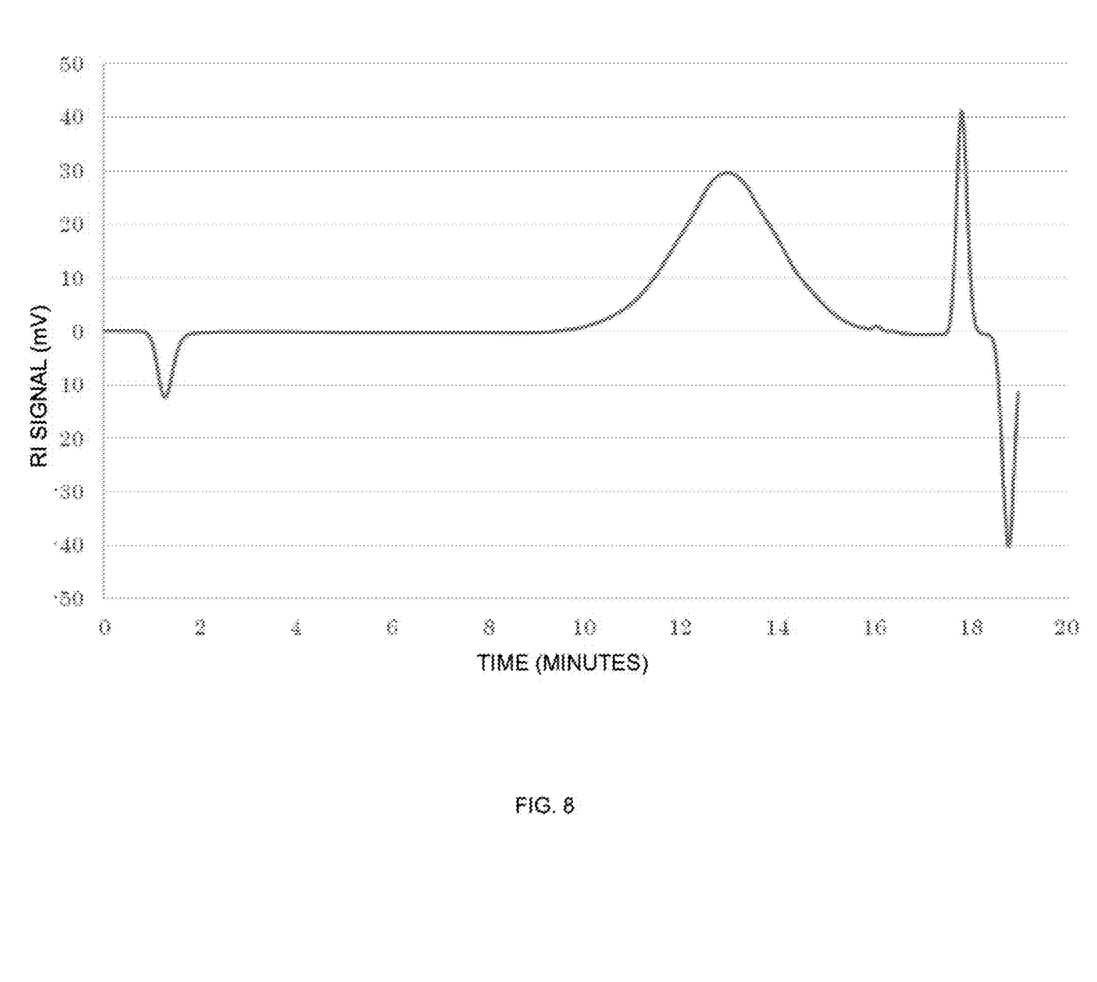
FIG. 8 is a drawing showing a GPC chart in Example 3.

A polymer film was obtained in the same manner as Example 2 other than setting the film formation temperature at 100° C. Evaluation was made in the same manner as Example 1. A good film similar to the polymer film in Example 1 was obtained, and the polymer film obtained in Example 3 had a weight average molecular weight of 17287. FIG. 8 illustrates a GPC chart.

Example 4

Figure 9:
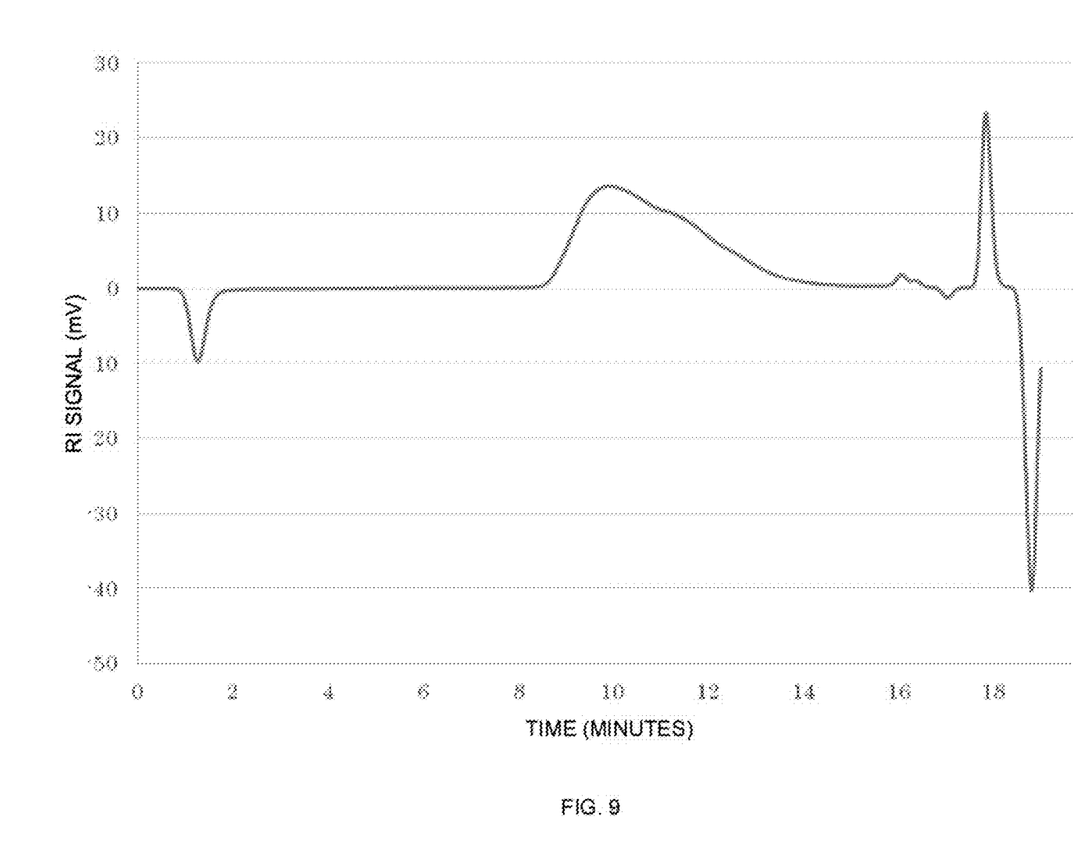
FIG. 9 is a drawing showing a GPC chart in Example 4.

A polymer film was obtained in the same manner as Example 3 other than using a solution obtained by mixing 1 part by weight of AIBN to 100 parts by weight of methyl methacrylate without using a solvent as the raw-material solution. Evaluation was made in the same manner as Example 1. A good film similar to the polymer film in Example 1 was obtained, and the polymer film obtained in Example 4 had a weight average molecular weight of 153574. FIG. 9 illustrates a GPC chart. Here, the weight average molecular weight of the polymer film obtained in Example 4 was obtained in standard polystyrene equivalent using a GPC system (HLC-8220 manufactured by Tosoh Corporation, solvent: chloroform).

As clearly seen from Example 4, it was found that film formation without a solvent enables fabrication of a high molecular weight polymer film in a short time.

In any embodiment of the present invention, it is possible to easily form a thin film and the film is excellent in adhesion.

The method for producing a polymer of the present invention is applicable to the field of film formation of any polymer and is useful industrially. Particularly in the polymer industries, the production method and the production apparatus of the present invention may be utilized preferably for polymer thin film formation.

The embodiments of the invention in which an exclusive property or privilege is claimed are defined as follows:

1. A method for producing a polymer by polymerization from a monomer, comprising:
   a first step of turning a raw material liquid containing the monomer into a mist or droplets by an atomization with ultrasonic vibration or a droplet-formation with ultrasonic vibration, wherein the raw material liquid contains no solvent, and the ultrasonic vibration is propagated via water to the raw material liquid;
   a second step of carrying the mist or droplets onto a substrate using a carrier gas; and
   the mist or droplets on the substrate being heated at temperatures from 80° C. to 600° C. to form into a film through a thermal reaction of the mist or droplets under atmospheric pressure.

2. The method of claim 1, wherein the monomer is a vinyl monomer and the raw-material liquid contains a radical polymerization initiator.

3. A method for producing an organic film by reaction of an organic compound, comprising:
   a first step of turning a raw-material liquid containing the organic compound into a mist or droplets by an atomization with ultrasonic vibration or a droplet-formation with ultrasonic vibration, wherein the raw material liquid contains no solvent, and the ultrasonic vibration is propagated via water to the raw material liquid; and
   a second step of carrying the mist or droplets onto a substrate using a carrier gas,
   the mist or droplets on the substrate being heated at temperatures from 80° C. to 600° C. to form into a film through a thermal reaction of the mist or droplets under atmospheric pressure.

4. The method of claim 1, wherein the raw material liquid is stored in a first container of a mist generator, the first container of the mist generator is placed in water stored in a second container with an ultrasonic vibration transducer provided, and the ultrasonic vibration is propagated via water to the raw material liquid.

5. The method of claim 1, wherein the carrier gas is supplied from one or more locations.

6. The method of claim 3, wherein the raw-material liquid is stored in a first container of a mist generator, the first container of the mist generator is placed in water stored in a second container with an ultrasonic vibration transducer provided, and the ultrasonic vibration is propagated via water to the raw material liquid.

7. The method of claim 3, wherein the carrier gas is supplied from one or more locations.

8. A method of producing a film comprising:
turning a raw material solution with ultrasonic vibration propagated via water to the raw material solution into a mist or droplets; and
carrying the mist or droplets onto a substrate using a carrier gas,
the mist or droplets on the substrate being heated at a temperature in a range of 80° C. to 600° C. to form into a film through a thermal reaction of the mist or droplets of the raw material solution under atmospheric pressure.

9. The method of claim 8, wherein the film is a polymer film.

10. The method of claim 8, wherein the film is an organic film.

11. The method of claim 8, wherein the raw-material solution is stored in a first container of a mist generator, the first container of the mist generator is placed in water stored in a second container with an ultrasonic vibration transducer provided, and the ultrasonic vibration is propagated via water to the raw material solution.

12. The method of claim 8, wherein the carrier gas is supplied from one or more locations.

13. The method of claim 11, wherein the mist generator is connected to the film formation chamber by a supply pipe.

14. The method of claim 11, wherein the film formation chamber is connected to an exhaust pipe.

15. The method of claim 14, wherein the exhaust pipe is connected to a trap tank.

16. The method of claim 8, wherein the carrier gas comprises a dilution gas.

17. A method of producing a film comprising:
turning a raw material solution with ultrasonic vibration into a mist or droplets; and
carrying the mist or droplets onto a substrate using a carrier gas that flows at a rate in a range of 0.01 to 20 L/min, the mist or droplets on the substrate being heated at a temperature in a range of 80° C. to 600° C. to form into a film through a thermal reaction of the mist or droplets of the raw material solution under atmospheric pressure.

18. The method of claim 8, wherein the carrier gas flows at a rate in a range of 0.01 to 20 L/min.

* * * * *